US010415452B1

United States Patent
Shepard et al.

(10) Patent No.: US 10,415,452 B1
(45) Date of Patent: Sep. 17, 2019

(54) EXHAUST GAS HEAT RECOVERY ENERGY EXTRACTION STRATEGY

(71) Applicant: GM Global Technology Operations LLC, Detroit, MI (US)

(72) Inventors: Daniel J. Shepard, Milford, MI (US); Eugene V. Gonze, Pinkney, MI (US); Douglas Dickson, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/909,150

(22) Filed: Mar. 1, 2018

(51) Int. Cl.
| | |
|---|---|
| *F01N 5/02* | (2006.01) |
| *F02D 41/06* | (2006.01) |
| *F28D 21/00* | (2006.01) |
| *F01M 5/02* | (2006.01) |
| *B60H 1/18* | (2006.01) |

(52) U.S. Cl.
CPC ............... *F01N 5/02* (2013.01); *F01M 5/021* (2013.01); *F02D 41/064* (2013.01); *F28D 21/0003* (2013.01); *B60H 1/18* (2013.01); *F28F 2250/06* (2013.01)

(58) Field of Classification Search
CPC ...... F01N 3/2006; F01N 5/02; F01N 2240/02; F01P 2007/146
See application file for complete search history.

(56) References Cited

U.S. PATENT DOCUMENTS

2017/0241324 A1* 8/2017 Liu ..................... F01P 5/10

* cited by examiner

*Primary Examiner* — Jonathan R Matthias

(57) ABSTRACT

An automobile vehicle exhaust gas heat recovery system includes an engine having a turbocharger. A cooling pump provides coolant flow to the engine and the turbocharger. A combined coolant discharge header receives coolant discharged from the engine and the turbocharger. A main rotary valve receives coolant discharged from the combined coolant discharge header. The main rotary valve includes multiple rotary valves selectively distributing all of the coolant in the combined coolant discharge header to at least one of an engine heater, a heater core and a transmission oil heater during a cold start operation. An exhaust gas heat recovery (EGHR) device is positioned to receive the coolant discharged from any one, any two or all of the engine heater, the heater core and the transmission oil heater and in a path to return the coolant to the cooling pump during the cold start operation of the engine.

20 Claims, 2 Drawing Sheets

EXHAUST GAS HEAT RECOVERY ENERGY EXTRACTION STRATEGY

INTRODUCTION

The present disclosure relates to automobile vehicle exhaust gas heat recovery systems.

Current automobile vehicle engine designs consume less fuel than previous designs, however, the thermal efficiency of an internal combustion engine has not increased significantly. The peak efficiency reached by a 4-cycle engine is approximately 35%, therefore approximately 65% of the energy contained in the fuel is lost due to a combination of pumping losses, friction losses, cooling losses, exhaust losses and accessories. A significant portion of thermal efficiency loss occurs in the exhaust system.

The energy losses occurring inside an exhaust system of an internal combustion engine are due to several causes: thermal, kinetic, chemical and latent heat. Of these, the most important energy loss components are thermal and kinetic losses. As is known, a portion of the kinetic losses can be recovered through a turbocharger. In order to reduce thermal losses, Exhaust Gas Heat Recovery (EGHR) systems have been developed which use exhaust heat to accelerate coolant heat up time or to generate energy returned to a battery or drive system. In coolant heat up systems an EGHR unit provides faster engine coolant heatup which in turn heats up the engine faster. A further benefit is faster cabin heatup for passenger comfort and window defrosting. In known EGHR systems, the engine cooling system is connected to a heat exchanger which is placed in the flow path of the exhaust gas, thereby transferring the thermal energy of the exhaust gas to the cooling system. Traditional EGHR units are therefore designed to work with mechanical cooling pumps and are primarily placed in the heater loop. This position, however, limits exhaust energy extraction due to high coolant backpressure creating a limited flow across the heater core.

Thus, while current EGHR systems achieve their intended purpose, there is a need for a new and improved system and method for exhaust gas heat recovery.

SUMMARY

According to several aspects, an automobile vehicle exhaust gas heat recovery system includes an engine receiving flow of a coolant from a cooling pump. A coolant discharge header receives the flow of the coolant discharged from the engine. The main rotary valve receives the coolant discharged from the coolant discharge header and selectively distributes the coolant to a heater core and a transmission oil heater. An exhaust gas heat recovery (EGHR) device is positioned to receive the coolant discharged from the heater core and the transmission oil heater and in a path to return the coolant to the cooling pump during a cold start operation of the engine.

In another aspect of the present disclosure, an engine oil heater receives the coolant from the main rotary valve.

In another aspect of the present disclosure, the main rotary valve includes individual rotary valves, including a first rotary valve controlling coolant flow into the engine oil heater, a second rotary valve controlling coolant flow into the heater core, and a third rotary valve controlling coolant flow into the transmission oil heater.

In another aspect of the present disclosure, an engine control and monitoring system is in communication with the individual rotary valves of the main rotary valve, the engine control and monitoring system directing opening and closing operation of the individual rotary valves of the main rotary valve such that at least one of the engine oil heater, the heater core and the transmission oil heater receives flow of the coolant during the engine cold start operation.

In another aspect of the present disclosure, during the cold start operation, substantially all of the coolant in the coolant discharge header flows through at least one or multiple ones of the engine oil heater, the heater core or the transmission oil heater.

In another aspect of the present disclosure, a radiator and a radiator supply header are in communication with the coolant discharge header, wherein after completion of the cold start operation a flow path is provided for the coolant in the coolant discharge header to bypass the main rotary valve via the radiator supply header and into the radiator to be cooled prior to return to the cooling pump.

In another aspect of the present disclosure, the main rotary valve includes a fourth rotary valve acting when opened and when the first rotary valve, the second rotary valve and the third rotary valve are each closed to bypass the flow of the coolant around the engine oil heater, the heater core, the transmission oil heater and the EGHR device for return to the cooling pump.

In another aspect of the present disclosure, a turbocharger receives a portion of the flow of the coolant and directs the portion of the flow of the coolant to a heat exchanger positioned in the EGHR device.

In another aspect of the present disclosure, a coolant pressure drop of the EGHR device is approximately 15+/−2 kPa at a flow rate of approximately 30 L per minute.

In another aspect of the present disclosure, the cooling pump is an electric motor driven cooling pump.

According to several aspects, an automobile vehicle exhaust gas heat recovery system includes an engine having a turbocharger. A cooling pump provides a flow of a coolant to the engine and to the turbocharger. A combined coolant discharge header receives the flow of the coolant discharged from the engine and the turbocharger. A main rotary valve receives the coolant discharged from the combined coolant discharge header and selectively distributes the coolant to a heater core and a transmission oil heater. An exhaust gas heat recovery (EGHR) device is positioned to receive all of the coolant discharged from the heater core and the transmission oil heater during a cold start operation of the engine and in a path to return the coolant to the cooling pump.

In another aspect of the present disclosure, the EGHR device includes a bypass valve.

In another aspect of the present disclosure, the EGHR device includes a heat exchanger, and the bypass valve is selectively positioned during the cold start operation to a bypass position to direct all of the coolant discharged from the heater core and the transmission oil heater for cooling by the heat exchanger of the EHGR device.

In another aspect of the present disclosure, an engine control and monitoring system is in communication with the bypass valve and with individual rotary valves of the main rotary valve.

In another aspect of the present disclosure, an engine oil heater is aligned to receive the coolant from the main rotary valve, and the main rotary valve includes individual rotary valves, including a first rotary valve controlling coolant flow into the engine oil heater, a second rotary valve controlling coolant flow into the heater core, and a third rotary valve controlling coolant flow into the transmission oil heater.

In another aspect of the present disclosure, the main rotary valve includes a fourth rotary valve acting when opened and when the first rotary valve, the second rotary valve and the third rotary valve are each closed to bypass the flow of the coolant around the engine oil heater, the heater core, the transmission oil heater and the EGHR device and into a main rotary valve bypass line for return to the cooling pump.

In another aspect of the present disclosure, a maximum coolant flow rate of the EGHR device is approximately 150 L per minute.

According to several aspects, an automobile vehicle exhaust gas heat recovery system includes an engine having a turbocharger. A cooling pump provides coolant flow to the engine and the turbocharger. A combined coolant discharge header receives coolant discharged from the engine and the turbocharger. A main rotary valve receives coolant discharged from the combined coolant discharge header. The main rotary valve includes multiple rotary valves selectively distributing all of the coolant in the combined coolant discharge header to at least one of an engine heater, a heater core and a transmission oil heater during a cold start operation. An exhaust gas heat recovery (EGHR) device is positioned to receive the coolant discharged from any one, any two or all of the engine heater, the heater core and the transmission oil heater and in a path to return the coolant to the cooling pump during the cold start operation of the engine.

In another aspect of the present disclosure, the EGHR device includes a bypass valve; and the EGHR device includes a heat exchanger.

In another aspect of the present disclosure, the bypass valve is selectively positioned during the cold start operation to a bypass position to direct all of the coolant discharged from the engine oil heater, the heater core and the transmission oil heater for cooling by the heat exchanger of the EHGR device.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
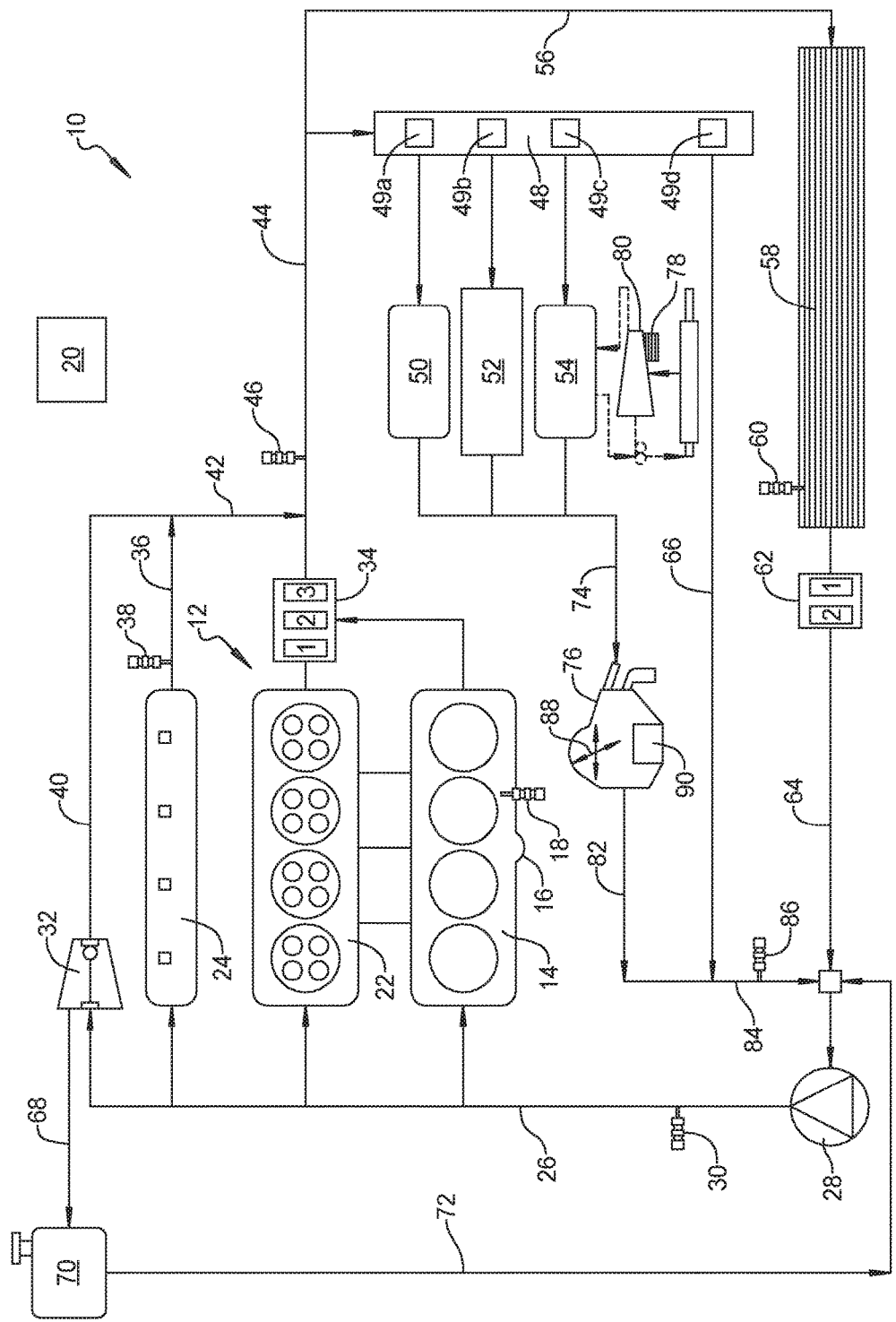
FIG. 1 is a diagrammatic presentation of an exhaust gas heat recovery system according to an exemplary embodiment.

Referring to FIG. 1, an exhaust gas heat recovery (EGHR) system 10 regulates and provides directed coolant flow to multiple components of an automobile vehicle combustion engine 12 and associated components and recovers heat for use by the system. The engine 12 includes an engine block 14 which may include a block heater 16 to provide a minimum block temperature during periods of extremely low ambient temperature, and is provided with a block temperature sensor 18 which forwards engine block temperature signals to an engine control and monitoring system 20. The engine 12 also collectively includes an engine head 22 and an integrated engine manifold 24 which are also cooled by the coolant. Coolant flow is provided to the engine block 14, the engine head 22 and the integrated engine manifold 24 by a coolant supply header 26 which is supplied with a flow of a coolant discharged from an electric motor driven electric cooling pump 28. The electric motor of the electric cooling pump 28 operates from signals received from the engine control and monitoring system 20. An inlet coolant temperature sensor 30 is provided in the coolant supply header 26 to provide a temperature signal for the coolant temperature in the coolant supply header 26.

A turbocharger 32 is also provided with the engine 12. The coolant supply header 26 is also connected to the turbocharger 32 providing a portion of the flow of the coolant in the coolant supply header 26 to permit heat to be extracted from the exhaust discharged via the turbocharger 32. An engine rotary valve 34 is provided to collect and control the flow of the combined coolant flow discharged from the engine block 14 and the engine head 22. A separate manifold coolant discharge header 36 collects coolant flow discharged from the integrated engine manifold 24. A temperature sensor 38 is provided in the manifold coolant discharge header 36 to provide a temperature signal of the coolant temperature in the manifold coolant discharge header 36. A turbocharger coolant discharge header 40 collects coolant flow discharged from the turbocharger 32 and combines this coolant flow with coolant flow from the manifold coolant discharge header 36 in a collection header 42. Coolant flow in the collection header 42 is combined with coolant flow discharged from the engine rotary valve 34 in a combined coolant discharge header 44. An outlet coolant temperature sensor 46 is provided in the combined coolant discharge header 44 to provide a temperature signal of the coolant flow in the combined coolant discharge header 44.

A first flow path for the coolant in the combined coolant discharge header 44 is into a main rotary valve 48 which includes multiple internal rotary valves 49a, 49b, 49c, 49d described below, which are operated by signals from the engine control and monitoring system 20 to control coolant distribution to individual ones of an engine oil heater 50, a heater core 52 and a transmission oil heater 54. During normal cold start operation of the engine 12, substantially all of the coolant in the combined coolant discharge header 44 flows through at least one or any ones of the engine oil heater 50, the heater core 52 or the transmission oil heater 54.

During normal operation of the engine 12 and therefore after completion of the cold start operation, a second flow path is provided for the coolant in the combined coolant discharge header 44 which bypasses the main rotary valve 48 via a radiator supply header 56 and is directed into a radiator 58 to be cooled prior to return to the suction or inlet of the electric cooling pump 28. A temperature sensor 60 is provided in the radiator 58 to provide a temperature signal of the coolant temperature in the radiator 58. Coolant flow through the radiator 58 is controlled using a radiator valve 62 which opens to direct coolant flow into a radiator discharge header 64 for return to the electric cooling pump 28. The radiator valve 62 is closed during the cold start operation to force coolant flow through the main rotary valve 48. Coolant flow is directed through the radiator 58 only after the engine cold start operation is completed or if an override command from the engine control and monitoring system 20 is provided to open the radiator valve 62 during the engine cold start operation.

The main rotary valve 48 provides individual rotary valves, including a first rotary valve 49a controlling coolant flow into the engine oil heater 50, a second rotary valve 49b controlling coolant flow into the heater core 52, a third rotary valve 49c controlling coolant flow into the transmission oil heater 54, and a fourth rotary valve 49d which is opened to direct coolant flow through a separate main rotary valve bypass line 66. During a cold engine start, at least one of the first rotary valve 49a, the second rotary valve 49b and the third rotary valve 49c will be at least partially open, thereby providing immediate coolant flow back to the electric cooling pump 28. Signals from the engine control and monitoring system 20 are thereafter generated which determine which of the first rotary valve 49a, the second rotary valve 49b and the third rotary valve 49c are open to pass coolant flow. For example, during a cold engine start, the second rotary valve 49b controlling coolant flow into the heater core 52 will normally be opened to provide most of the coolant flow from the combined coolant discharge header 44 through the heater core 52 to provide rapid cabin heatup.

The main rotary valve bypass line 66 is provided to bypass a portion of the coolant received in the main rotary valve 48 around the engine oil heater 50, the heater core 52 and the transmission oil heater 54. Coolant may be directed through the main rotary valve bypass line 66 for example during a cold start operation if a high power demand is made on the engine 12 which rapidly heats the engine 12 and requires more coolant flow than can be provided through the combined paths of the engine oil heater 50, the heater core 52 and the transmission oil heater 54. The rotary valve 49d is otherwise normally shut.

A coolant surge line 68 is provided with the EGHR system 10 which can be connected to the turbocharger 32 for directing coolant surge flow from the EGHR system 10 to a surge tank 70. Coolant can be returned from the surge tank 70 to the EGHR system 10 at a suction side of the electric cooling pump 28 via a surge return line 72.

A coolant collection header 74 receives and combines coolant discharged from each of the engine oil heater 50, the heater core 52 and the transmission oil heater 54. The combined coolant flow in the coolant collection header 74 is received in an exhaust gas heat recovery (EGHR) device 76, which is positioned in the coolant collection header 74 and therefore receiving the coolant discharged from the main rotary valve 48 downstream of each of the engine oil heater 50, the heater core 52 and the transmission oil heater 54, which may be positioned to receive the coolant in parallel with each other. Because the EGHR device 76 may receive some or all of the coolant flow from any or all of the engine oil heater 50, the heater core 52 and the transmission oil heater 54, the EGHR device 76 is designed to provide low coolant backpressure compared to the coolant backpressure of known EGHR units which normally receive flow only from a heater core.

The EGHR device 76 maximizes heat extraction by integrating the EGHR device 76 in the EGHR system 10 in a flow path downstream of the primary energy sinks, defined herein as the transmission oil heater 54 and the heater core 52 of the vehicle cabin heater. Because the engine oil heater 50, the heater core 52 and the transmission oil heater 54 have released the thermal energy in the coolant passing through these components, the coolant discharged from the engine oil heater 50, the heater core 52 and the transmission oil heater 54 is the coldest coolant in the coolant loop during warmup conditions and therefore provides the greatest temperature difference to advantageously recover the heat energy of the system, using the equation 1:

$$Q = mc\Delta T$$

where: heat energy (Q)=(mass of the coolant substance)×(specific heat)×(change in temperature). For equation 1, Q=heat energy (Joules, J), m=mass of a substance (kg), c=specific heat (units J/kg·K), and $\Delta T$=change in temperature (Kelvin, K).

Selectively directing all of the engine coolant flow through the EGHR device 76 simultaneously heats the coldest coolant in the loop being returned to the electric cooling pump 28, therefore the overall coolant temperature of the EGHR system 10 is increased more quickly than known systems having an EGHR device 76 in communication primarily with only a heater core. Heat extraction can be further enhanced by the addition of a temperature sensor 78 provided in a transmission 80, such as in a transmission oil sump, providing a temperature signal of the transmission 80 and therefore providing an additional signal directing operation of the rotary valve 49c controlling coolant flow into the transmission oil heater 54.

Coolant discharged from the EGHR device 76 flows through an EGHR discharge header 82 and is combined with any coolant flow received from the main rotary valve bypass line 66 in a combined return header 84, which directs coolant flow to the suction of the electric cooling pump 28. A temperature sensor 86 is provided in the combined return header 84 to provide a temperature signal of the coolant temperature in the combined return header 84. It is noted that coolant flow entering the main rotary valve 48 downstream of the turbocharger 32 substantially bypasses the radiator 58, thereby enhancing the opportunity to maximize heat recovery of the energy generated by the engine 12 and the turbocharger 32 using the EGHR device 76 after the coolant passes through at least one of the transmission oil heater 54, the heater core 52, and the engine oil heater 50 which are all positioned between the engine 12 and the EGHR device 76.

The individual temperature sensors of the EGHR system 10 identified herein each forward signals to the engine control and monitoring system 20. These include the temperature sensors 18, 30, 38, 46, 60, 78 and 86. Using the temperature indication signals, the engine control and monitoring system 20 controls operation of the electric cooling pump 28, the engine rotary valve 34 and the individual valves of the main rotary valve 48.

According to several aspects, the EGHR device 76 may include a bypass valve 88 rotated by a signal from the engine control and monitoring system 20. During engine cold start operation, the bypass valve 88 is rotated to a heat recovery position (shown as a solid line). In the heat recovery position coolant flow through the EGHR device 76 is directed by the bypass valve 88 through or past a heat exchanger 90. The heat exchanger 90 enhances heat recovery of the energy generated by the engine 12 and the turbocharger 32 using the EGHR device 76 by maximizing the recovered heat energy (Q). This is accomplished by advantageously using the highest temperature difference $\Delta T$ described above in equation 1 between the coolant and the engine heat. The highest temperature difference $\Delta T$ is provided after the coolant passes through at least one of the transmission oil heater 54, the heater core 52, and the engine oil heater 50, thereby decreasing the temperature of the coolant prior to flow past the heat exchanger 90. After conclusion of the engine cold start operation, the bypass valve 88 is rotated to a bypass position (shown in dashed lines) wherein coolant flow is not directed through or onto the heat exchanger 90. According to several aspects, a coolant pressure drop of the EGHR device 76 is approximately 15+/−2 kPa at a flow rate of approximately 30 Liters (L) per minute. According to further aspects, a maximum coolant flow rate of the EGHR device 76 is approximately 150 L per minute for an engine of approximately 300 hp, and smaller for an engine of lower power.

Figure 2:
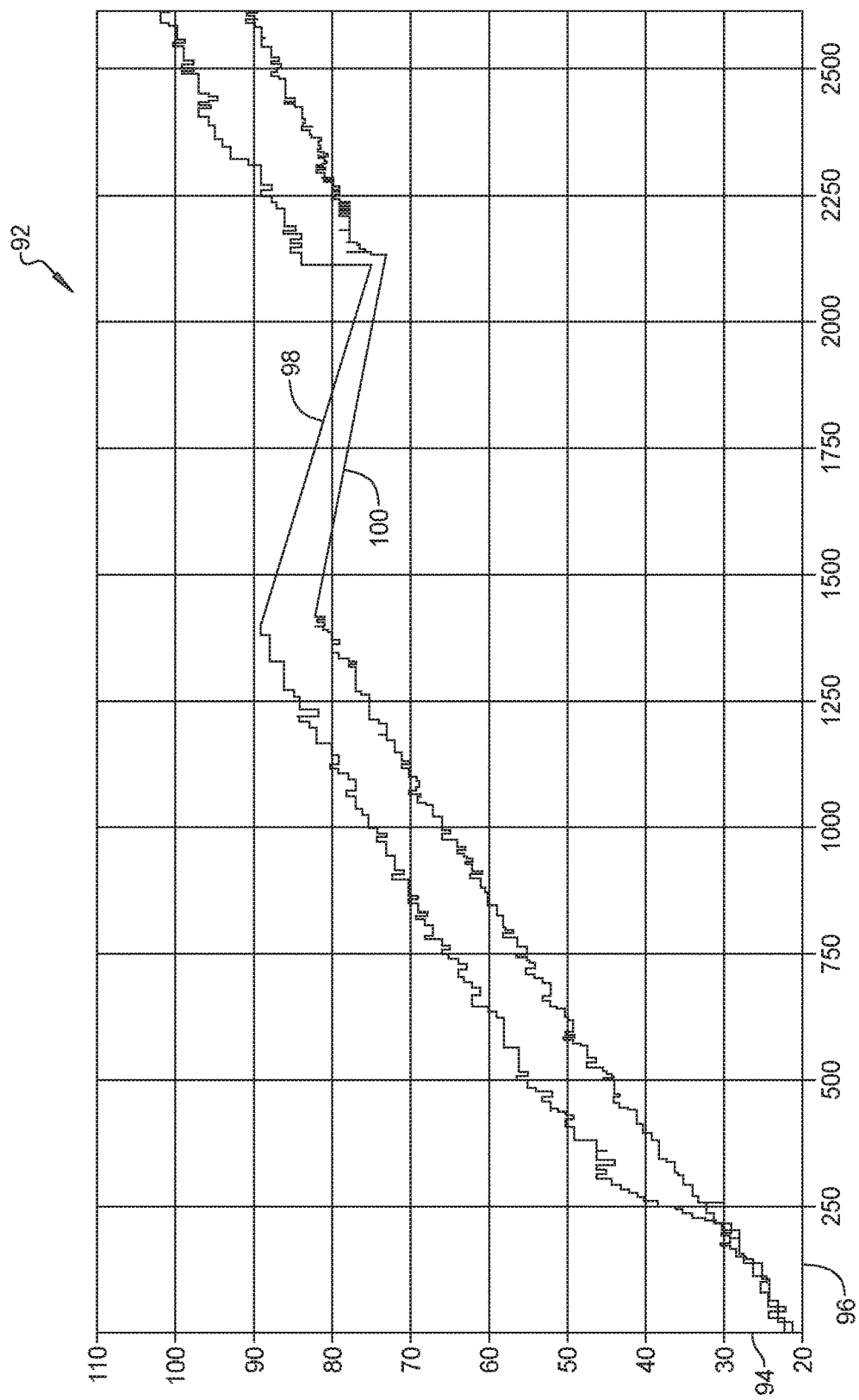
FIG. 2 is a graph depicting power level versus time providing a simulated warming benefit created by the exhaust gas heat recovery system of FIG. 1.

Referring to FIG. 2 and again to FIG. 1, a graph 92 presents engine power on a first axis 94 versus time on a second axis 96 in seconds. A first power curve 98 presents an estimated power using the EGHR system 10 of the present disclosure which is enhanced substantially over the entire time period compared to a second power curve 100 of a system without the EGHR system 10 of the present disclosure.

Due to the limited amount of available thermal energy during vehicle warmup it is desirable to extract the maximum thermal energy from all available sources. Additional fuel economy enhancement is possible with the additional energy recovery using engine warmup operation temperature. The EGHR system 10 of the present disclosure that positions the EGHR device 76 to receive coolant discharged from each of the transmission oil heater 54, the heater core 52, and the engine oil heater 50 which are all positioned between the engine 12 and the EGHR device 76 provides heating, ventilation and air conditioning (HVAC) performance improvements in cold conditions that saves vehicle cost.

An exhaust gas heat recovery system 10 of the present disclosure offers several advantages. These include improvement to the vehicle's CO2 and HVAC performance. The EGHR device 76 can be integrated into the coolant system flow path without system performance compromises or additional integration cost. Designing the EGHR device 76 with a low coolant backpressure allows high system coolant flow using an electric cooling pump. Further, by placing the EGHR device 76 in the return path of the heater core 52 and the transmission oil heater 54 in the cooling circuit coolant flow during most warm-up conditions is ensured. Exhaust energy extraction is maximized by directing all of the engine coolant flow through the EGHR device 76 while simultaneously using the coldest coolant in the loop during warmup.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automobile vehicle exhaust gas heat recovery system, comprising:
    an engine receiving flow of a coolant from a cooling pump;
    a coolant discharge header receiving the flow of the coolant discharged from the engine;
    a main rotary valve receiving the coolant discharged from the coolant discharge header and selectively distributing the coolant to a heater core and a transmission oil heater; and
    an exhaust gas heat recovery (EGHR) device positioned downstream of the heater core and the transmission oil heater, the EGHR device receiving all of the coolant discharged from the heater core and the transmission oil heater during a cold start operation of the engine and directing return of the coolant to the cooling pump.

2. The automobile vehicle exhaust gas heat recovery system of claim 1, further including an engine oil heater receiving the coolant from the main rotary valve.

3. The automobile vehicle exhaust gas heat recovery system of claim 2, wherein the main rotary valve includes individual rotary valves, including a first rotary valve controlling coolant flow into the engine oil heater, a second rotary valve controlling coolant flow into the heater core, and a third rotary valve controlling coolant flow into the transmission oil heater.

4. The automobile vehicle exhaust gas heat recovery system of claim 3, further including an engine control and monitoring system in communication with the individual rotary valves of the main rotary valve, the engine control and monitoring system directing opening and closing operation of the individual rotary valves of the main rotary valve such that at least one of the engine oil heater, the heater core and the transmission oil heater receives flow of the coolant during the engine cold start operation.

5. The automobile vehicle exhaust gas heat recovery system of claim 3, wherein during the cold start operation, the coolant in the coolant discharge header flows through at least one or multiple ones of the engine oil heater, the heater core or the transmission oil heater.

6. The automobile vehicle exhaust gas heat recovery system of claim 3, further including a radiator and a radiator supply header in communication with the coolant discharge header, wherein after completion of the cold start operation a flow path is provided for the coolant in the coolant discharge header to bypass the main rotary valve via the radiator supply header and into the radiator to be cooled prior to return to the cooling pump.

7. The automobile vehicle exhaust gas heat recovery system of claim 3, wherein the main rotary valve includes a fourth rotary valve acting when opened and when the first rotary valve, the second rotary valve and the third rotary valve are each closed to bypass the flow of the coolant around the engine oil heater, the heater core, the transmission oil heater and the EGHR device for return to the cooling pump.

8. The automobile vehicle exhaust gas heat recovery system of claim 1, further including a turbocharger receiving a portion of the flow of the coolant and directing the portion of the flow of the coolant to a heat exchanger positioned in the EGHR device.

9. The automobile vehicle exhaust gas heat recovery system of claim 1, wherein a coolant pressure drop of the EGHR device is 15+/−2 kPa at a flow rate of approximately 30 L per minute.

10. The automobile vehicle exhaust gas heat recovery system of claim 1, wherein the cooling pump is an electric motor driven cooling pump.

11. An automobile vehicle exhaust gas heat recovery system, comprising:
    an engine having a turbocharger;
    a cooling pump providing a flow of a coolant to the engine and to the turbocharger;
    a combined coolant discharge header receiving the flow of the coolant discharged from the engine and the turbocharger;
    a main rotary valve receiving the coolant discharged from the combined coolant discharge header and selectively distributing the coolant to a heater core and a transmission oil heater; and
    an exhaust gas heat recovery (EGHR) device positioned downstream of the heater core and the transmission oil heater to receive all of the coolant discharged from the heater core and the transmission oil heater during a cold start operation of the engine and in a path to return the coolant to the cooling pump.

12. The automobile vehicle exhaust gas heat recovery system of claim 11, wherein the EGHR device includes a bypass valve.

13. The automobile vehicle exhaust gas heat recovery system of claim 12, wherein the EGHR device includes a heat exchanger positioned within the EGHR device, and wherein the bypass valve is selectively positioned during the cold start operation to a bypass position to direct all of the coolant discharged from the heater core and the transmission oil heater for cooling by the heat exchanger of the EHGR device.

14. The automobile vehicle exhaust gas heat recovery system of claim 13, wherein the main rotary valve includes multiple individual rotary valves, and further including an engine control and monitoring system in communication with the bypass valve and with the multiple individual rotary valves of the main rotary valve.

15. The automobile vehicle exhaust gas heat recovery system of claim 14, further including:
 an engine oil heater aligned to receive the coolant from the main rotary valve; and
 the multiple individual rotary valves include a first rotary valve controlling coolant flow into the engine oil heater, a second rotary valve controlling coolant flow into the heater core, and a third rotary valve controlling coolant flow into the transmission oil heater.

16. The automobile vehicle exhaust gas heat recovery system of claim 15, wherein the main rotary valve includes a fourth rotary valve acting when opened and when the first rotary valve, the second rotary valve and the third rotary valve are each closed to bypass the flow of the coolant around the engine oil heater, the heater core, the transmission oil heater and the EGHR device into a main rotary valve bypass line for return to the cooling pump.

17. The automobile vehicle exhaust gas heat recovery system of claim 11, wherein a maximum coolant flow rate of the EGHR device is 150 L per minute.

18. An automobile vehicle exhaust gas heat recovery system, comprising:
 an engine having a turbocharger;
 a cooling pump providing flow of a coolant to the engine and the turbocharger;
 a combined coolant discharge header receiving the coolant discharged from the engine and the turbocharger;
 a main rotary valve receiving the coolant discharged from the combined coolant discharge header, the main rotary valve including multiple individual rotary valves selectively distributing all of the coolant in the combined coolant discharge header to at least one of an engine heater, a heater core and a transmission oil heater during a cold start operation of the engine, the multiple individual rotary valves including a first rotary valve controlling coolant flow into the engine oil heater, a second rotary valve controlling coolant flow into the heater core, and a third rotary valve controlling coolant flow into the transmission oil heater; and
 an exhaust gas heat recovery (EGHR) device positioned downstream of the engine heater, the heater core and the transmission oil heater to receive the coolant discharged from any one, any two or all of the engine heater, the heater core and the transmission oil heater and in a path to return the coolant to the cooling pump during the cold start operation of the engine.

19. The automobile vehicle exhaust gas heat recovery system of claim 18, wherein:
 the EGHR device includes a bypass valve; and
 the EGHR device includes a heat exchanger.

20. The automobile vehicle exhaust gas heat recovery system of claim 19, wherein the bypass valve is selectively positioned during the cold start operation to a bypass position to direct all of the coolant discharged from the engine oil heater, the heater core and the transmission oil heater for cooling by the heat exchanger of the EHGR device.

* * * * *